United States Patent [19]
DeMong et al.

[11] Patent Number: 6,095,320
[45] Date of Patent: Aug. 1, 2000

[54] CONVEYOR DEPLOYMENT SYSTEM

[75] Inventors: Maurice DeMong; Edward Krueckl, both of Saskatoon, Canada

[73] Assignee: Prairie Machine & Parts Mfg., Ltd., Saskatoon, Canada

[21] Appl. No.: 09/140,021

[22] Filed: Aug. 26, 1998

[51] Int. Cl.[7] .................................................. B65G 21/14
[52] U.S. Cl. ......................... 198/812; 198/823; 198/841
[58] Field of Search ................................... 198/812, 588, 198/594, 303, 823, 841, 866

[56] References Cited

U.S. PATENT DOCUMENTS

| | | |
|---|---|---|
| 2,678,125 | 5/1954 | Bonney, Jr. . |
| 2,904,166 | 9/1959 | Stinson ................................... 198/842 |
| 3,211,277 | 10/1965 | Knapp et al. ........................... 198/842 |
| 4,007,827 | 2/1977 | Mattos .................................... 198/862 |
| 4,245,738 | 1/1981 | Butcher et al. ......................... 198/812 |
| 4,513,859 | 4/1985 | Long et al. ............................. 198/842 |
| 4,860,878 | 8/1989 | Mraz et al. ............................. 198/309 |
| 4,978,000 | 12/1990 | Mohr ...................................... 198/641 |
| 5,181,600 | 1/1993 | Chappell et al. . |
| 5,307,917 | 5/1994 | Hall . |
| 5,685,415 | 11/1997 | East ........................................ 198/812 |
| 5,850,903 | 12/1998 | Walters ................................... 198/588 |
| 5,938,004 | 8/1999 | Roberts et al. ......................... 198/812 |
| 5,979,642 | 11/1999 | Hall et al. .............................. 198/812 |

FOREIGN PATENT DOCUMENTS 253230A  10/1986  Germany .

Primary Examiner—Christopher P. Ellis
Assistant Examiner—Rashmi Sharma
Attorney, Agent, or Firm—Young & Basile, P.C.

[57] ABSTRACT

An extensible support apparatus for extending the length of an endless conveyor belt system including a set of roller supporting frames arranged in a row with each having a vertically extending framework with rollers for the conveyor rotatably mounted thereon and a horizontally extending elongate frame member. Connectors are mounted on the frame members so that each is movable horizontally along the frame member of an adjacent supporting frame. A loading apparatus is also provided for arranging this support apparatus in the conveyor belt system. The loading apparatus includes a base frame, a loading frame pivotably mounted on one side of the base frame and a horizontally movable supporting frame capable of supporting the extensible support apparatus.

24 Claims, 12 Drawing Sheets

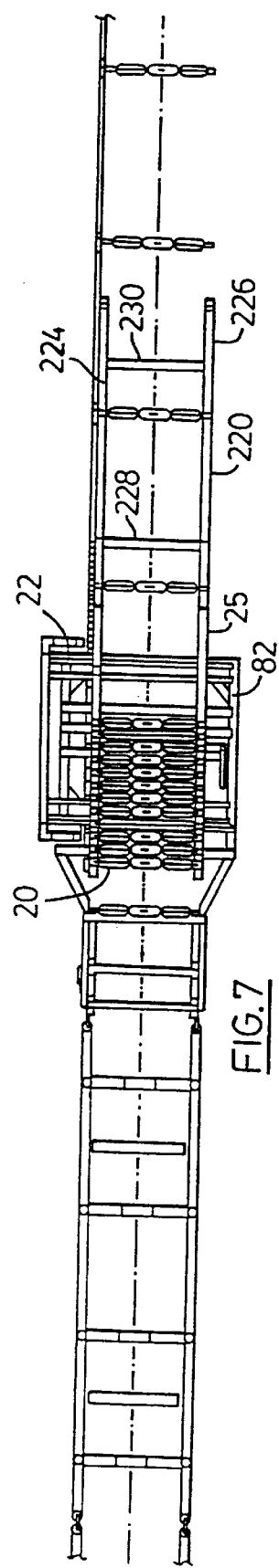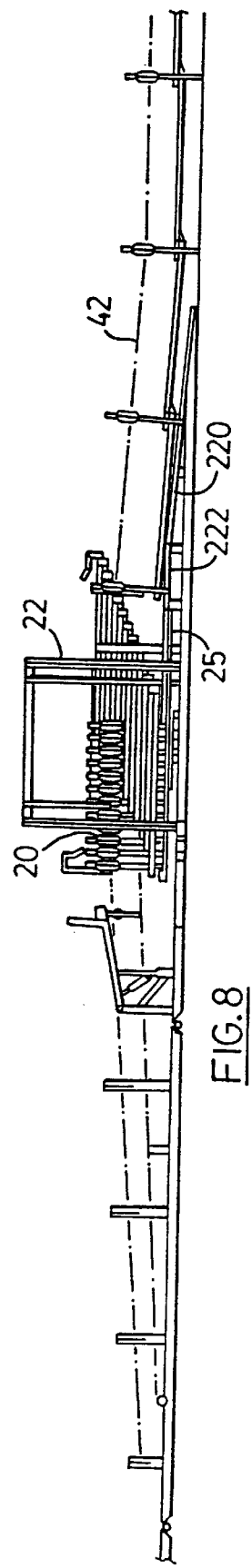

CONVEYOR DEPLOYMENT SYSTEM

BACKGROUND OF THE INVENTION

This invention relates to endless conveyor belt systems and, in particular, to an apparatus for extending the length of such systems, loading apparatus used to extend a conveyor belt system, and conveyor belt lifting apparatus.

It is well known to provide a continuous mining machine in a modern mine in order to mine ore both quickly and efficiently from an underground passageway or room. In order to remove the ore produced by the miner, an elongate endless conveyor belt is provided usually to move the ore quickly from the rear end of the miner. An extendible conveyor bridge system can be provided between the miner and the relatively long conveyor belt system. A common problem with the known endless conveyor belt systems is that they can be difficult and time consuming to extend or make longer, an operation which is often required as the mining machine advances into the ore body and also to subsequently remove when the mining operation is completed.

It is known to provide independent support stands for an endless conveyor belt system. These stands, for example, can be of the type referred to as pin connected trailing stands. The stands may be slid along a surface in a group with the stands connected to each other by means of pins. When it is desired to deploy the stands, the pin or pins are pulled and the stands separated and spaced from each other into position. Deployment of such stands is difficult and requires considerable manual effort. Proper spacing of these stands is difficult to maintain as such spacing requires operator judgment and attention.

Currently, when a conveyor belt extension is required, the mining operation is stopped. This allows the endless conveyor belt to be split, a series of support frames constructed, troughing and return rollers inserted with idlers, and joiner bars installed and connected before the conveyor belt is reconnected. This belt extension operation is very labor intensive and time consuming. After the mining operation in a particular area has been completed, the conveyor stands must then be retrieved, another labor intensive operation.

U.S. Pat. No. 4,860,878 issued Aug. 29, 1989 to DM Enterprises Inc. teaches an extensible support system for an endless conveyor belt which has a plurality of pairs of primary and secondary interconnected members and a plurality of chains secured between these members to restrict the spacing thereof at their lower ends. There are also transverse members interconnecting portions of the primary and secondary members. There is also provided a carrier for the primary and secondary members, this carrier including a pair of longitudinally extending rail members on which the former members are supported and guided.

Recent U.S. Pat. No. 5,181,600 issued Jan. 26, 1993 to Ian C. Chappell et al. describes an extendible conveyor structure made of a plurality of H-frames, each comprised of two vertically extending supports and a cross-member. Each H-frame is pivotably connected to an adjacent H-frame or H-frames. Extensible lengths in the form of chains and cross-braces maintain the rigidity of this structure. The conveyor structure can be loaded and unloaded onto a trailer with hydraulically adjustable axles so that the clearance of the trailer chassis is adjustable.

It is an object of the present invention to provide an extensible support structure for an endless conveyor belt which reduces the amount of labor required and the amount of time required to extend an endless conveyor system.

It is a further object of the present invention to provide a loading apparatus for arranging the aforementioned extensible support apparatus in a long endless conveyor belt system, which loading apparatus permits the extensible support apparatus to be installed reasonably quickly and easily, reducing substantially the amount of any downtime for the miner.

It is another object of the invention to provide a belt lifting apparatus that can be used in conjunction with the aforementioned loading apparatus for the purpose of adding an extension to a conveyor belt system. This belt lifting apparatus permits a length of the endless conveyor belt to be lifted so that the extensible support apparatus can be installed into the conveyor belt system at the desired location.

SUMMARY OF THE INVENTION

According to one aspect of the invention, an extensible support apparatus for an endless conveyor belt system comprises a set of roller supporting frames arranged in a row with each frame including a substantially planar, vertically extending framework with rollers for the conveyor belt rotatably mounted thereon and a horizontally extending elongate frame member connected to the vertically extending framework. The framework extends substantially transversely of its respective frame member. Connectors are mounted on the frame members and each is movable in a generally horizontally direction along the elongate frame member of an adjacent roller supporting frame and movably connects its respective roller supporting frame to the adjacent roller supporting frame. Each set of roller supporting frames is able to extend and retract between a compact transport configuration in which the vertically extending frameworks are arranged side-by-side and an extended configuration for supporting the conveyor belt.

Preferably each connector is a loop-type connector that extends around and is slidable along the elongate frame member of the adjacent roller supporting frame. Each vertically extending framework includes two upright support legs and a horizontally extending connecting frame member.

According to another aspect of the invention, a loading apparatus for arranging an extensible support apparatus in a long endless conveyor belt system includes a generally horizontal base frame capable of resting on a horizontally extending supporting surface in longitudinal alignment with the conveyor belt system and a loading frame pivotably mounted on one side of the base frame. This one side extends substantially parallel to a longitudinal axis of the conveyor system. The loading frame is pivotable from a horizontal position where the loading frame extends outwardly from one side of the base frame to an elevated position where the loading frame extends vertically. A pivoting mechanism is connected to the loading frame for pivoting same from the horizontal position to the elevated position. A movable supporting frame capable of supporting the extensible support apparatus is horizontally movable between a first position located over the base frame and a second position located over the loading frame when the latter is in its horizontal position. A drive mechanism is also provided to move the supporting frame from the second position to the first position.

The preferred drive mechanism includes at least one hydraulic cylinder device connected to the base frame and extending substantially horizontally.

According to a further aspect of the invention, a belt lifting apparatus usable with an endless conveyor belt system in order to add an extension to the conveyor belt system includes a rigid, horizontally extending base frame adapted to lie on a supporting surface and an upwardly extending supporting framework mounted on the base frame and supported thereby. There is also a listing frame for raising a length of the conveyor belt temporarily, this frame being pivotably connected at one end to the supporting framework. A drive mechanism is connected to this lifting frame for pivoting it from a lowered position to a raised position. A belt lifting frame member is mounted on the lifting frame and is adapted to engage a lower surface of the length of conveyor belt.

The preferred drive mechanism in this belt lifting apparatus is a hydraulic cylinder device connected to one side of the lifting frame.

Further features and advantages will become apparent from the following detailed description taken in conjunction with the drawings.

BRIEF DESCRIPTION OF THE DRAWINGS

FIG. 5 is a plan view of the extensible support apparatus of FIG. 2 mounted on a loading apparatus adapted to install the extensible support apparatus into an existing endless conveyor belt system;

FIG. 6 is a side elevation of the apparatus of FIG. 5, this view showing how the endless conveyor belt is raised for the installation step;

FIG. 7 is a plan view similar to FIG. 5 but showing the extensible support apparatus moved to a position where its longitudinal axis is aligned with that of the conveyor belt system;

FIG. 8 is a side elevation of the apparatus of FIG. 7, this viewing showing the sections of conveyor belt lowered so that they rest on the rollers of the extensible support apparatus;

DETAILED DESCRIPTION OF PREFERRED EMBODIMENT

Figure 1:
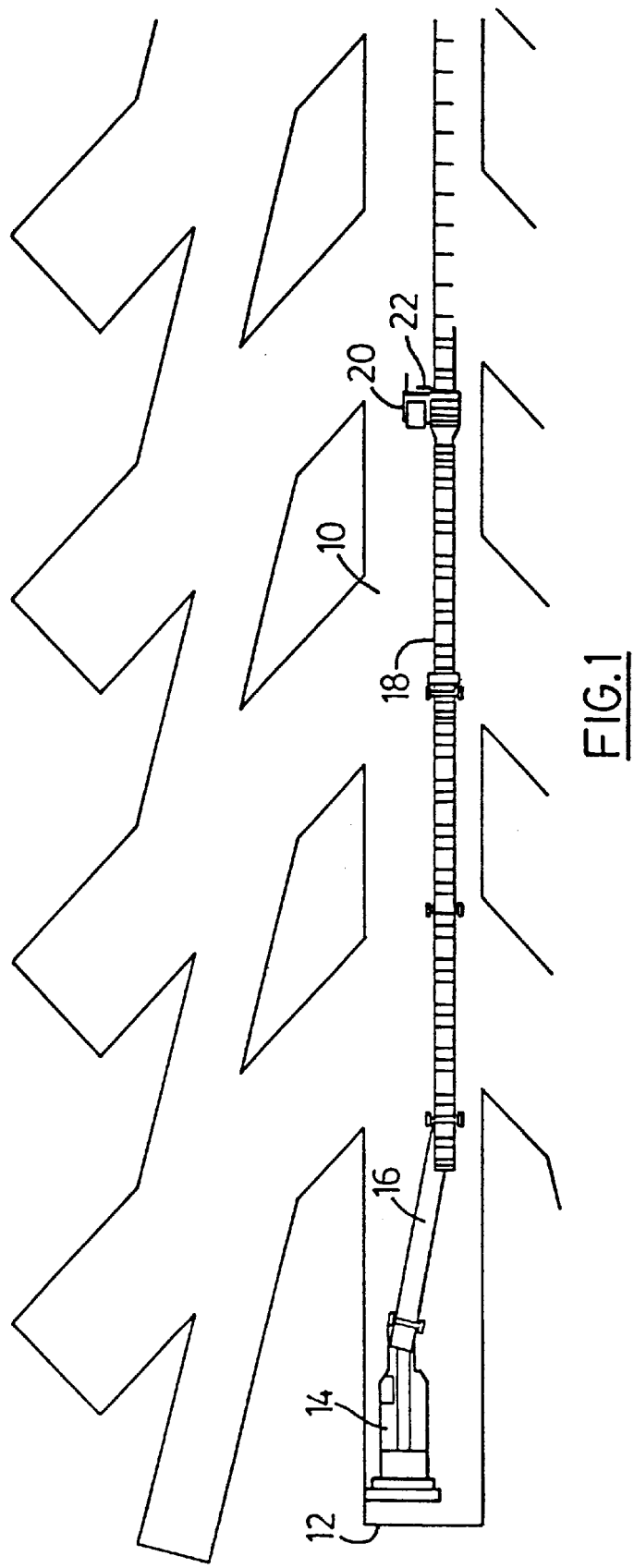
FIG. 1 is a schematic plan view showing the operation of a continuous mining machine in an underground mine with an endless conveyor belt system transporting the mine ore to a removal area.

FIG. 1 of the drawings illustrates a mining operation being carried out in an underground passageway 10 which extends generally horizontally. Mining the ore face at 12 is a known type of continuous mining machine 14. This mining machine is capable of delivering the mined ore to the rear of the machine where it is delivered to an extendible conveyor bridge system 16. The bridge conveyor system transports the ore material rearwardly to an elongate, continuous conveyor belt system (or room belt) 18 which is stationary and which must be extended periodically as the mining machine 14 advances in the mine. Also depicted in FIG. 1 is an extensible support apparatus 20 shown in much greater detail in FIGS. 2 to 4 and a loading apparatus 22 used to arrange the extensible support apparatus 20 in the long endless conveyor belt system. The extensible support apparatus or cassette 20 has been loaded onto a horizontally extending loading frame 24 shown in the horizontal position in FIG. 12. The cassette is adjacent to the side of the conveyor belt and has yet to be moved into alignment with the central longitudinal axis of the conveyor belt. A fork lift or loader available in the mine can be used to lift the cassette onto the loading frame 24.

Figure 2:
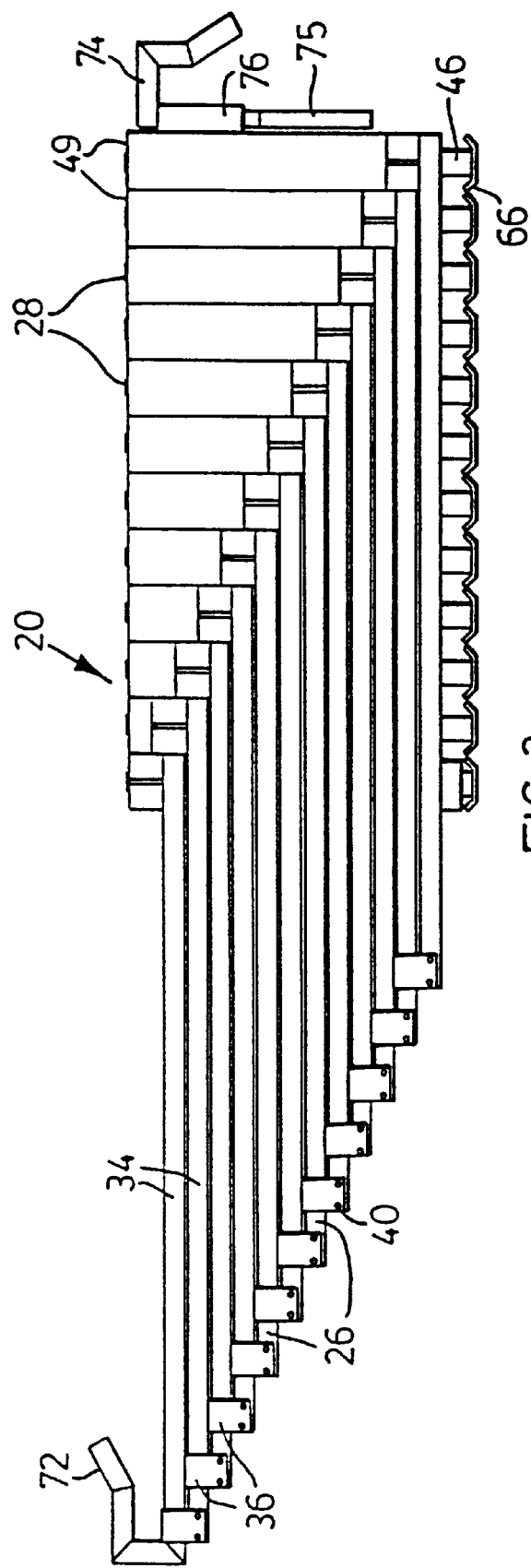
FIG. 2 is a side elevation of an extensible support apparatus for an endless conveyor belt constructed in accordance with the invention.
Figure 3:
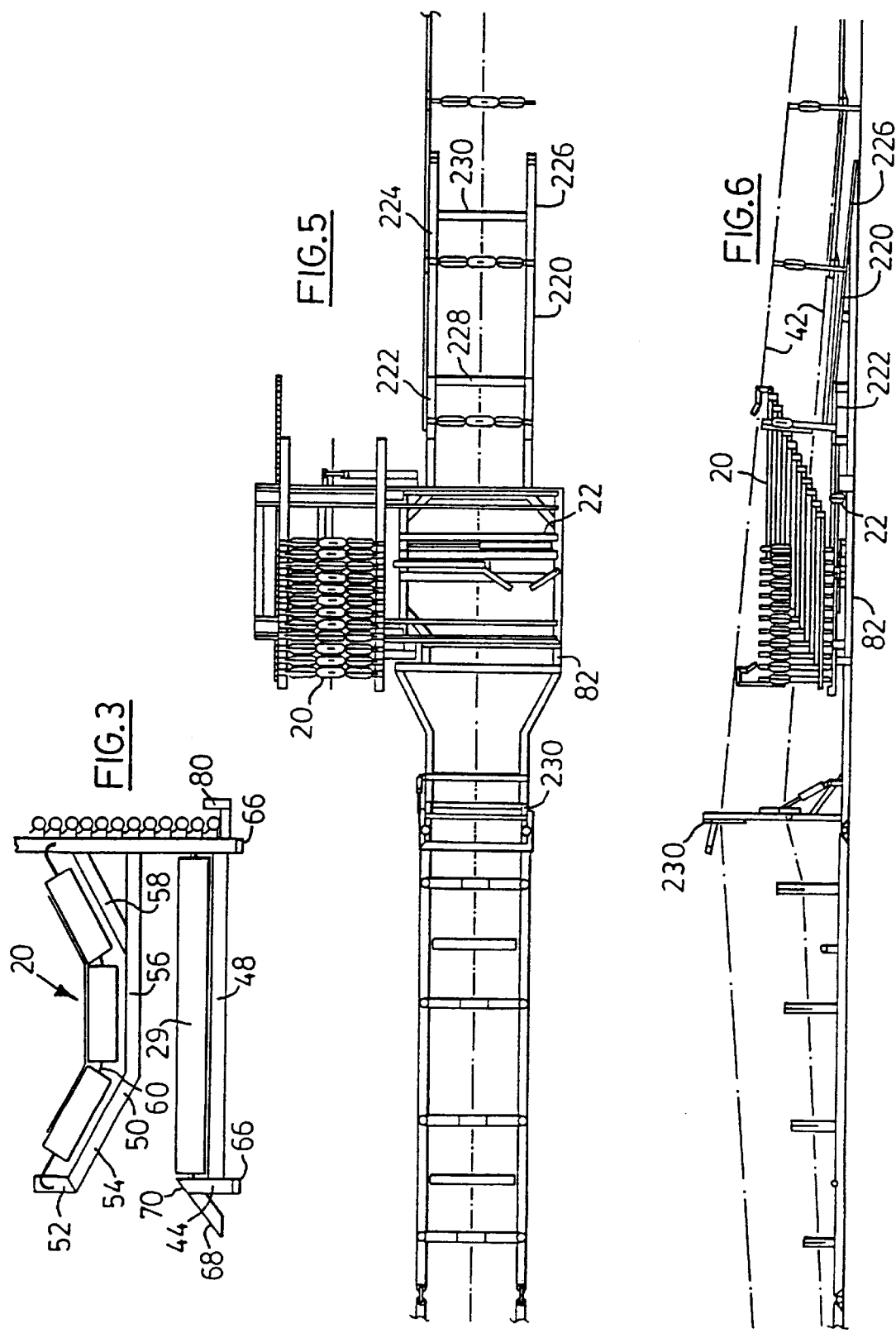
FIG. 3 is an end view of the support apparatus of FIG. 2.
Figure 4:
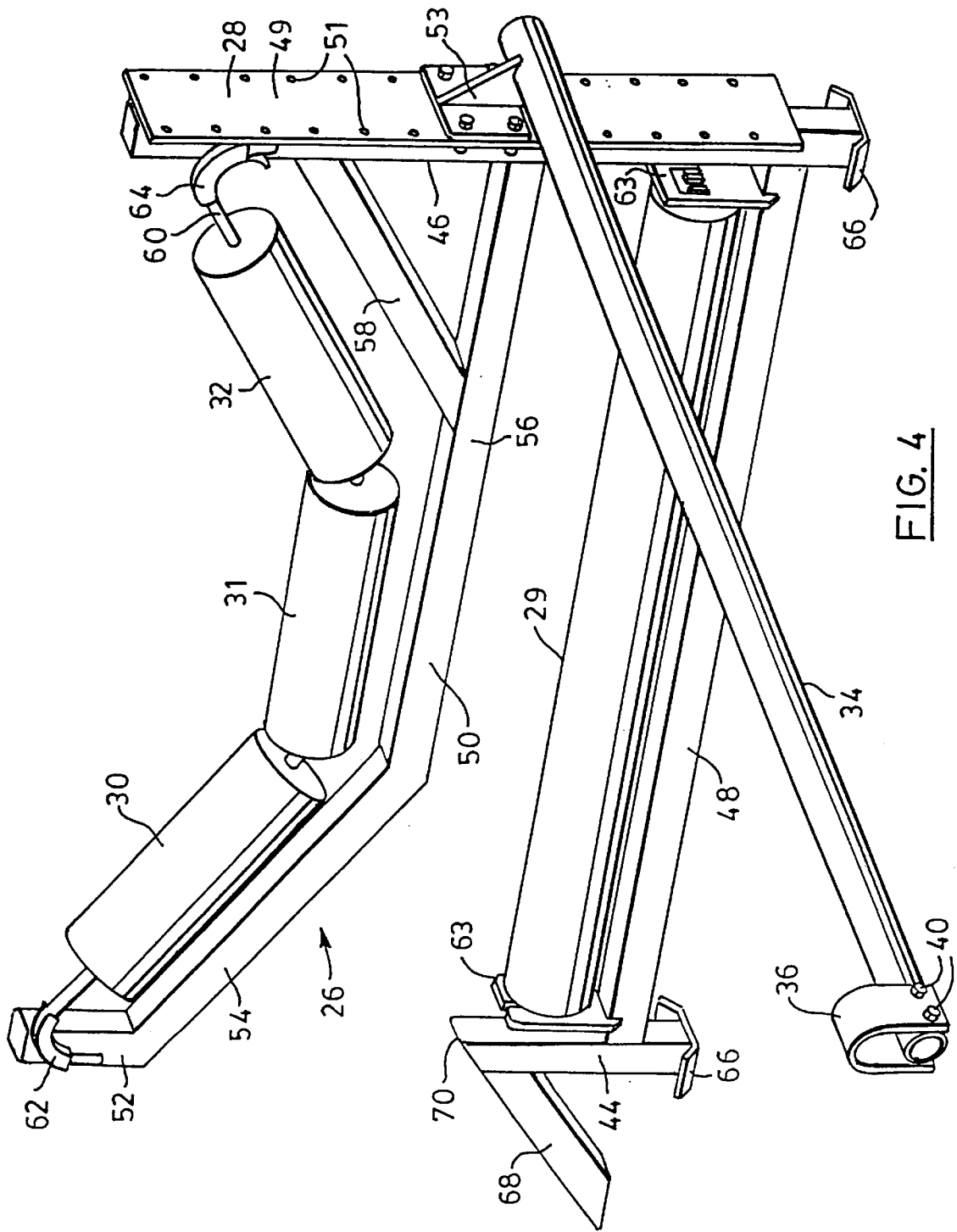
FIG. 4 is a perspective view of one of the roller supporting frames used in the apparatus of FIG. 2.

The extensible support cassette 20 shown in FIGS. 2 and 3 comprises a set of roller supporting frames 26, one of which is shown separately in FIG. 4. Each roller supporting frame 26 includes a substantially planar, vertically extending framework 28 having rollers 29 to 32 for the conveyor belt rotatably mounted thereon and a horizontally extending, elongate frame member 34 rigidly connected to the framework 28. The framework 28 preferably extends substantially transversely of its respective frame member 34. A connector 36 is mounted on the end of the frame member 34 furthest from the framework 28. Preferably each connector is a loop-type connector that extends around and is slidable along the elongate frame member 34 of an adjacent roller supporting frame as illustrated in FIG. 2. The preferred frame member 34 is a hollow cylindrical metal tube that is at least five feet long and can be as long as eight feet or more. The connector 36 can be attached to the end of its frame member by means of two bolts 40 that extend through the end of the frame member. It will be understood that each connector 36 movably connects its respective roller supporting frame 26 to an adjacent roller supporting frame. In the compact transport configuration of the cassette shown in FIG. 2, the frame members 34 are stacked one above the other but each frame member is slightly offset in the longitudinal direction relative to the frame member below it. Also, in this compact configuration, the vertically extending frameworks 28 of the set are arranged side-by-side. It will be understood that each set of roller supporting frames 26 is able to extend and retract between this compact configuration shown in FIG. 2 and an extended configuration for supporting the conveyor belt such as the belt 42 shown in FIGS. 6 and 8.

Preferably the framework 28 includes two upright support legs 44 and 46 and a horizontally extending connecting frame member 48 extending between the support legs and rigidly connecting them together. These legs and the frame member 48 can be tubular steel members having a square or rectangular cross-section. As shown in FIG. 4, the support leg 44 is substantially shorter than the opposite leg 46 to which the frame member 34 is connected by means of an elongate, connecting plate 49 having two rows of bolt holes 51. The plate 49 can be welded to the outer side of the leg 46. A connecting bracket 53 is bolted to the plate 49 using four of the holes 51. One end of the frame member 34 is rigidly joined to the bracket 53 so that it extends horizontally. Thus the height of each frame member 34 on its respective framework 28 is adjustable.

Each framework 28 also includes a roller supporting upper frame member 50 that extends substantially horizontally and is supported at one end thereof in cantilever fashion. At least one conveyor belt roller is rotatably mounted on the frame member 50. However, in the illustrated preferred embodiment, three rollers 30 to 32, which together form a troughing roller, are rotatably mounted between the outer end section 52 of the member 50 and the support leg 46. As illustrated, the frame member 50 includes a sloping outer section 54 and a substantially horizontal section 56. Helping to support the frame member 50 is a short, sloping corner frame member or brace 58 that can be welded to both the leg 46 and frame member 50. The three upper rollers 30 to 32 can, if desired, be rotatably mounted by means of a length of cable 60 that extends through a hole extending along the central axis of each roller and that is held at each end by means of arc-shaped cable holders or brackets 62 and 64. The bracket 62 is mounted on the end section 52 while the bracket 64 is mounted near the upper end of the leg 46. The brackets are customized to suit the particular job requirements and the troughing roller chosen. Alternatively, standard rotatable shafts mounted on suitable support brackets can also be used, if desired, to support the rollers 30 to 32. The roller 29 is a substantially horizontal, wide lower roller mounted just above the connecting frame member 48 by means of two vertical connector plates 63. It will be understood that the return length of the conveyor belt passes over the long roller 29 and because this length of belt is normally empty, the rollers 29 can be flat. However, the upper length of the conveyor belt is often formed in the shape of a trough in order that it will retain the ore or other material on the conveyor belt as it moves along. Accordingly, the three short rollers 30 to 32 can be considered a three part troughing roller which is mounted in cantilever fashion.

The number of roller supporting frames in each set can vary depending on various job requirements, but normally there would be at least six roller supporting frames arranged in a row. In the illustrated preferred embodiment, there are twelve roller supporting frames.

Preferably the bottom end of each support leg 44, 46 is provided with a short skid plate 66 which can be bent upwardly at opposite ends. These skid plates make it easier to slide the roller supporting frames over the mine floor as the apparatus is put in place. Also, a sloping guide member 68 can be mounted on the outside of each of the short legs 44. The members 68 can assist the users of the conveyor to slide the lower, return length of the conveyor belt onto the roller 29. The top end 70 of the leg 44 can be sloped for the same purpose.

Figure 17:
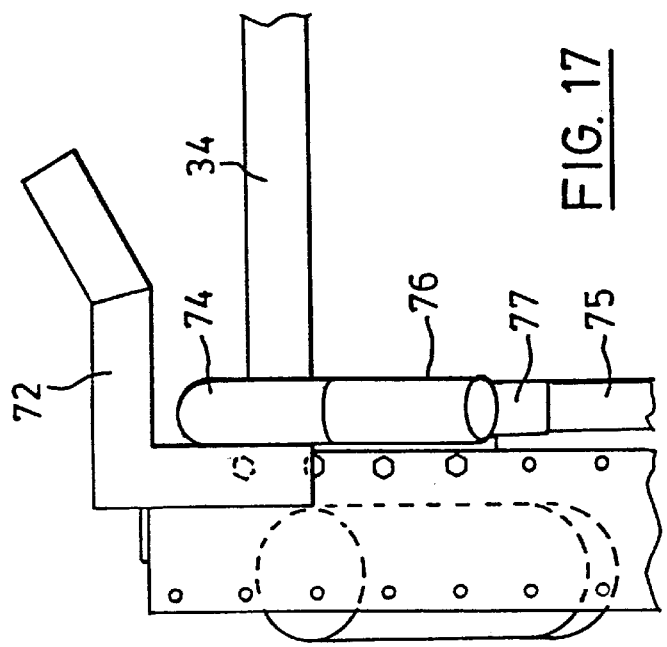
FIG. 17 is a detail side view showing the manner in which two extendible support apparatuses can be connected together using hook-shaped members.
Figure 14:
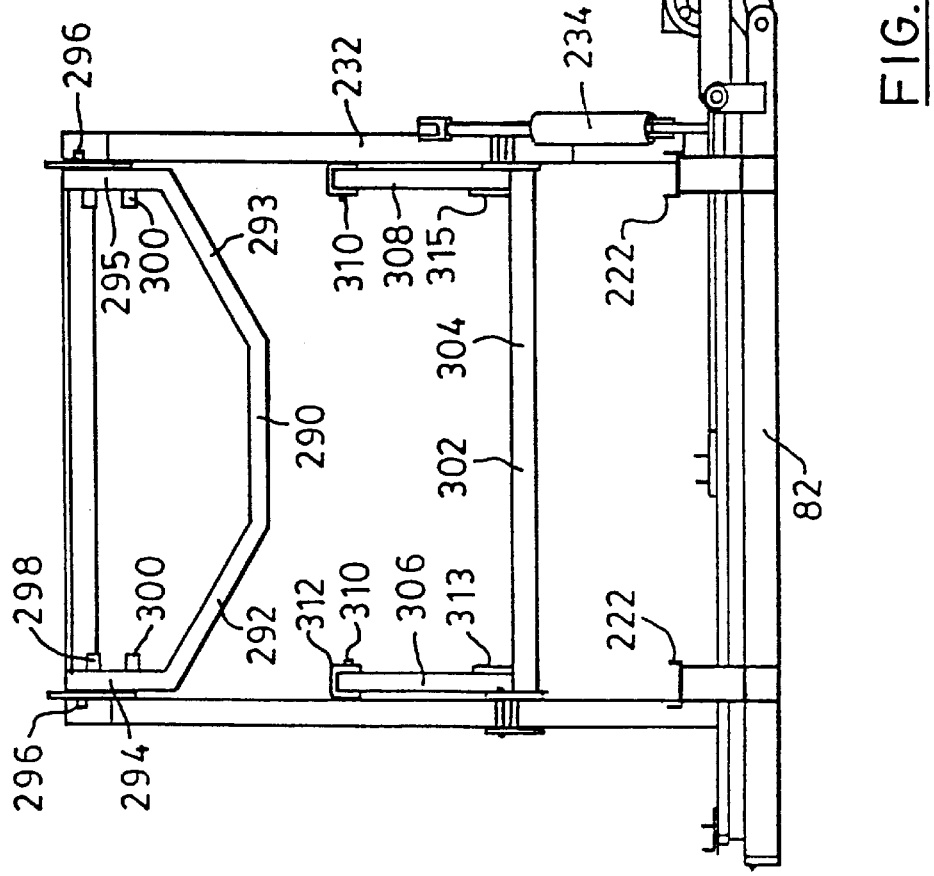
FIG. 14 is an end view of the apparatus of FIG. 13.

The uppermost frame member 34 as shown in FIG. 2 has no connector 36 fixedly mounted thereon but instead has a hook shaped extension 72 at its outer end. Also, a pivotable hook member 74 can be attached to the end framework 28 which is furthest from the hook shaped extension 72. The extension 72 and the hook shaped member 74 can be used to attach adjacent cassettes 20 to each other after a new cassette has been moved into the conveyor belt line. The members 72 and 74 are shown in the connected position in FIG. 17. The hook member 74 is pivotably mounted in a vertical sleeve 76 connected to an upper end section of the support leg 46 of the end supporting frame. The hook member 74 includes a relatively long post 75 that permits the hook member to be lifted up and then rotated in the tubular sleeve 76 ninety degrees outwardly to the position shown in FIG. 17. In this position, it can extend around the top frame member 34 and is held by the hook shaped extension 72. Preferably, the vertical sleeve 76 has a square horizontal cross-section and an upper section 77 of the post 75 also has a square cross-section that fits snugly in the sleeve. In this way, the post 75 is prevented from rotating in the sleeve 76 when the hook member 74 is in its lowered position.

Also, an outwardly projecting rest 80 can be provided near the bottom of the first roller supporting frame 26 as shown in FIG. 3. This rest 80 helps to keep the cassette 20 from toppling like dominos when it is being hauled around and put into position.

Shown in FIGS. 5 to 8 of the drawings are the steps for installing the extensible support apparatus 20 in the long endless conveyor belt system using a loading apparatus 22. In FIG. 5, the cassette of stands is shown in the same position as in FIG. 1, that is, adjacent to but to one side of the conveyor belt system. In FIG. 7, the cassette 20 has been moved by the loading apparatus 22 into a position where its longitudinal axis is aligned with the central longitudinal axis of the conveyor system. The loading apparatus 22 for moving the cassette into this aligned position will now be described in detail with particular reference to FIGS. 9 to 16.

The loading apparatus 22 includes a generally horizontal base frame 82 that is capable of resting on a horizontally extending support surface such as the floor of the mine passageway. As shown in FIGS. 1, 5 and 7, this base frame 82 is installed in longitudinal alignment with the conveyor belt system. The base frame can include two longitudinally extending main frames 84 and 86 and a number of transversely extending frame members 88, 90, 92, 94 and 96. Connecting corner frame members 98 can also be provided to increase the rigidity of the base frame. Rigidly mounted on top of the transverse frame members 88 and 96 are inverted V-shaped rails 100 and 102 on which roll four wheels 104 of a supporting frame 25.

Figure 9:
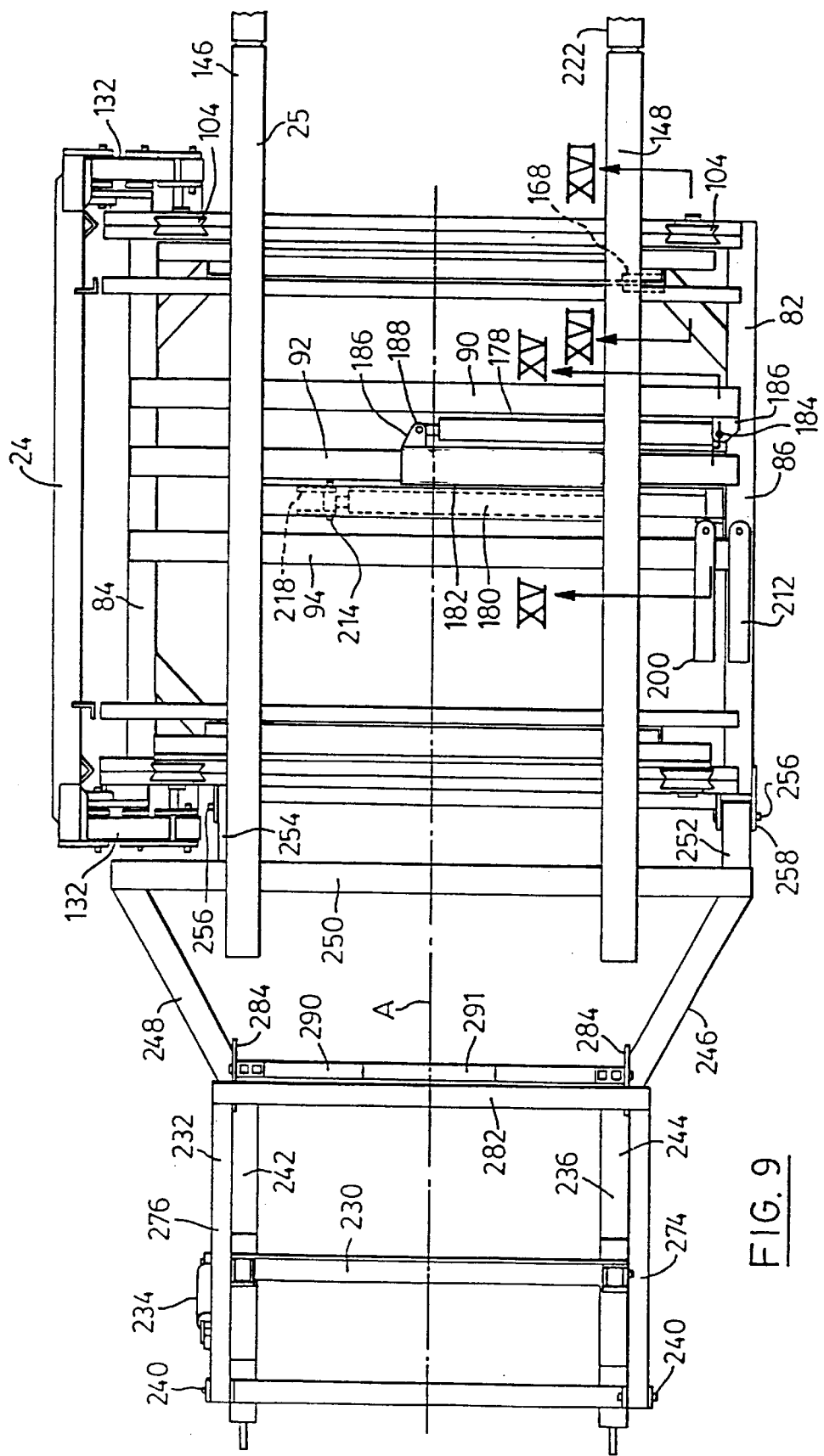
FIG. 9 is a plan view of the preferred loading apparatus and an adjacent, attached belt lifting apparatus.
Figure 11:
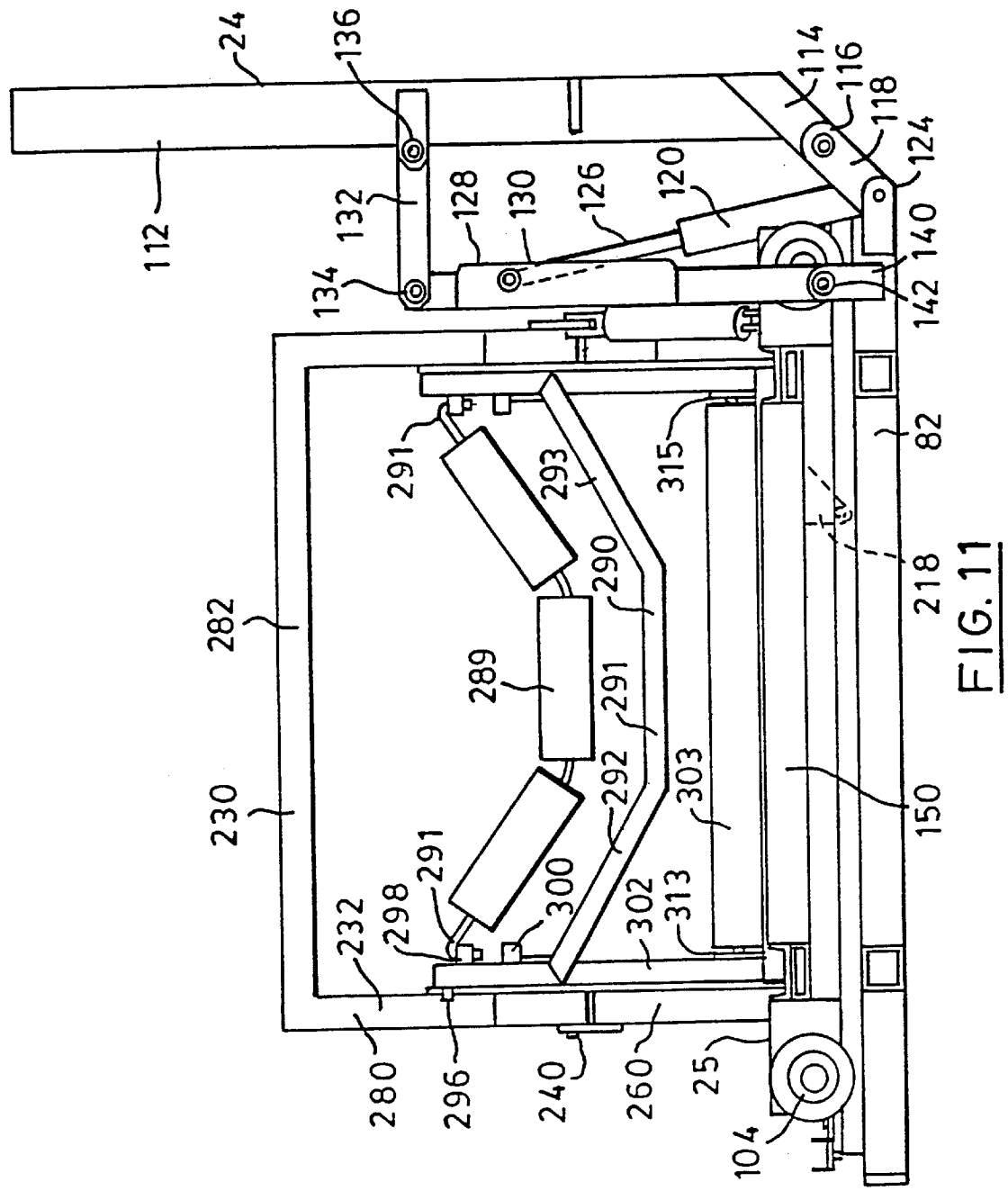
FIG. 11 is an end view of the apparatus of FIGS. 9 and 10.

The loading frame 24 is pivotably mounted on one side of the base frame 82 and is shown in an elevated position where the loading frame extends vertically in FIGS. 9 and 11. The loading frame is pivotable from this position to a horizontal position, shown in FIGS. 12 to 14, where the loading frame extends outwardly from one side of the base frame. The loading frame is mounted on a side of the base frame that extends substantially parallel to a longitudinal axis of the conveyor belt system. The loading frame includes two parallel, main frame members 106 and 108 and at least three connecting frame members 109 to 111. Mounted on the top of the main frame members 106 and 108 (when the loading frame 24 is in the horizontal position) are two inverted V-shaped rail members 112 on which the aforementioned wheels 104 also roll. Each rail 112 is aligned with a respective one of the rails 100, 102 when the loading frame is in the horizontal position. The loading frame 24 is pivotably connected on an inner side thereof to the base frame 82. For this purpose, pivot pin brackets 114 that extend upwardly at an angle at one end of the rails 112 are provided and these are pivotably connected by means of two pivot pins at 116 to similar sloping connecting brackets 118 formed on the base frame.

Figure 10:
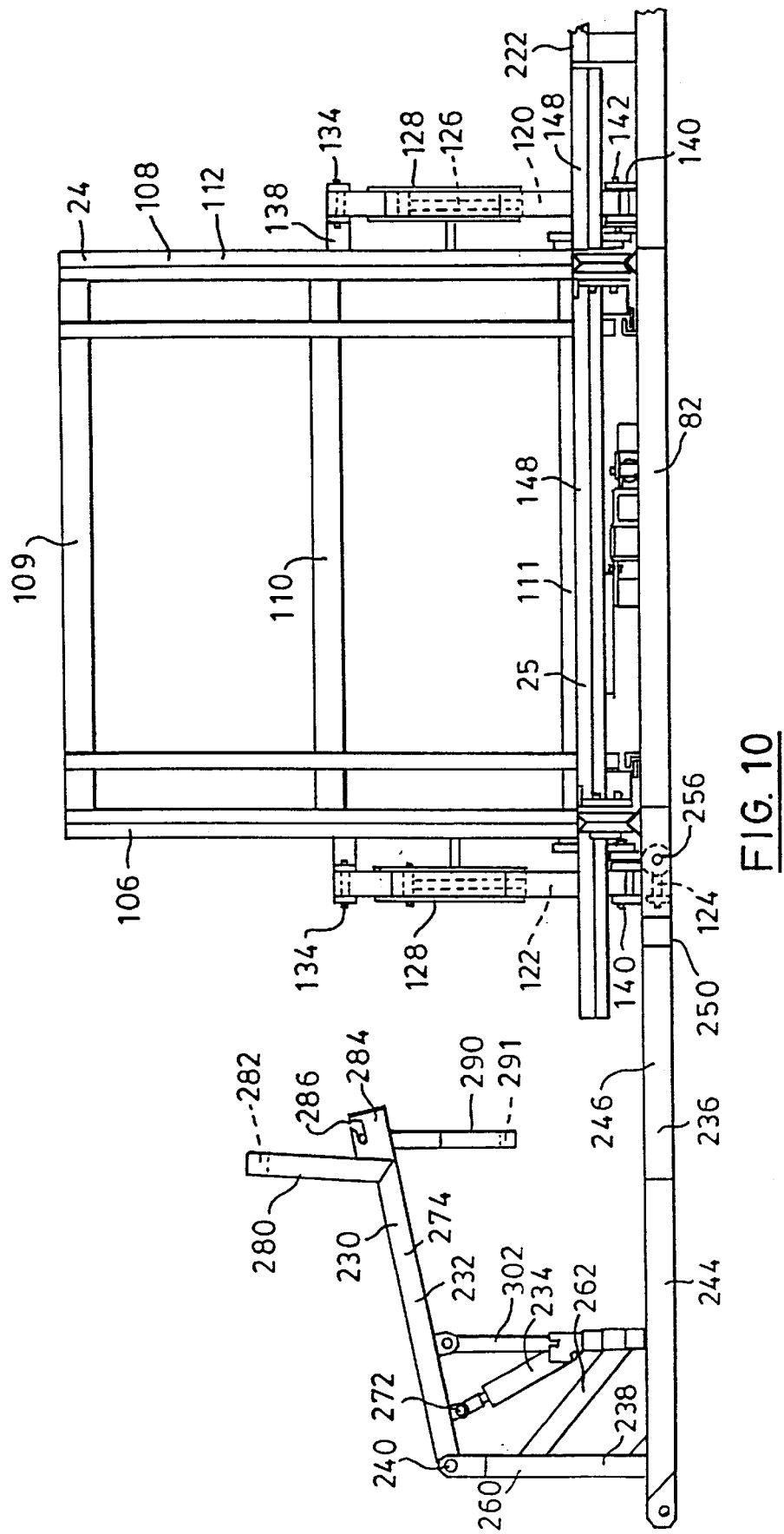
FIG. 10 is a side elevational view of the apparatus of FIG. 9.

With particular reference to FIGS. 10 and 11, it will be seen that pivoting means are provided for pivoting the loading frame from the horizontal position to the elevated position shown in FIGS. 10 and 11 and vice versa and these pivoting means are connected to the loading frame 24. The preferred illustrated pivoting means include two hydraulic cylinder devices 120 and 122, each of which has a bottom end thereof pivotably connected to the base frame at 124. A movable rod 126 of each cylinder device is pivotably connected at the top to a respective linkage mechanism 128. The preferred illustrated linkage mechanism comprises two, pivotably connected link members 130 and 132 which are connected at adjacent ends thereof by a pivot pin at 134. The shorter link 132 is pivotably connected to loading frame 24 via a pivot pin connector 136. Each pin 136 is mounted in a support bracket 138 that extends outwardly from its respective main frame member 106, 108.

The longer link member 130 is pivotably connected to an upwardly extending bracket 140 by means of a pivot pin connector 142. A movable supporting frame 25 capable of supporting the extensible support apparatus 20 is horizontally movable between a first position shown in FIG. 11 where it is located over the base frame 82 and a second position shown in FIG. 14 where it is located over the loading frame 24. Drive means indicated generally at 144 are provided for moving the supporting frame 25 to and from these first and second positions. The preferred illustrated supporting frame which is mounted on the aforementioned wheels 104 includes two elongate parallel channel members 146 and 148, each of which forms a channel with an open top and open ends. The supporting frame also includes at least two connecting frame members 150 which extend between and rigidly connect the channel members.

Figure 16:
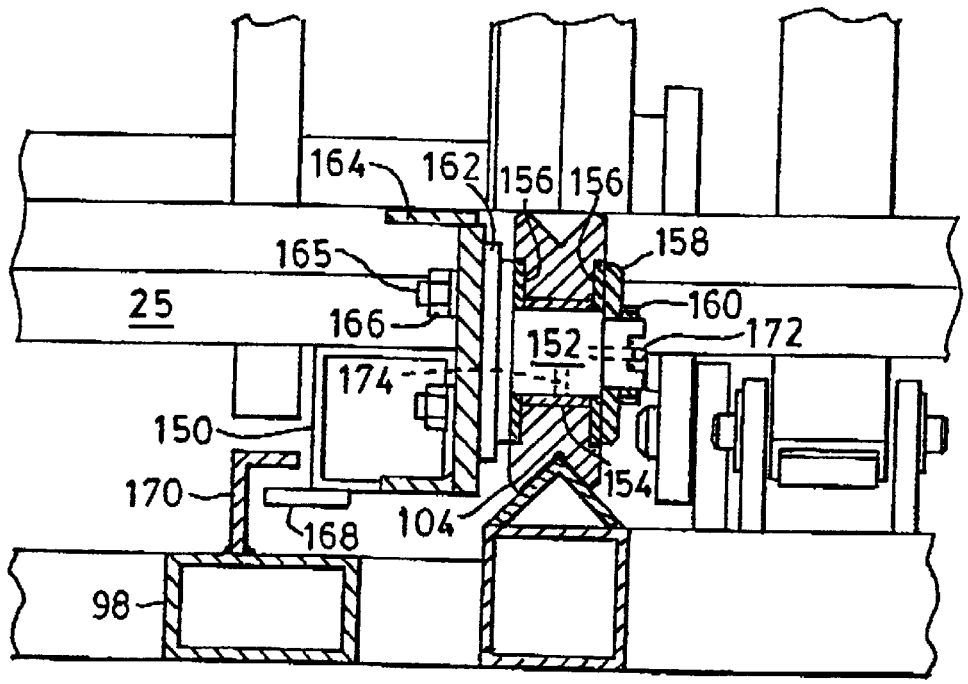
FIG. 16 is a cross-sectional elevation taken along the line XVI—XVI of FIG. 9 showing details of the wheel mounting for the loading frame.

Greater detail of the mounting arrangement for each wheel 104 on the supporting frame 25 can be seen from FIG. 16. In particular, the wheel 104 is mounted on a shaft 152 having a reduced end section. The wheel is rotatable on the shaft by means of a bushing 154 arranged between the wheel and the shaft. Located on opposite sides of the wheel are two thrust washers 156. Holding the wheel on the shaft is a retaining washer 158 which can be held in place by means of a lock washer and bearing nut at 160. Each shaft 152 is fixedly connected to a shaft mounting plate 162 which in turn is detachably connected to a short channel member 164 by means of four threaded fasteners 165 and cooperating nuts 166. Each channel member 164 is connected to an end of a respective tubular connecting frame member 150 of the supporting frame 25.

In order to provide additional guidance for the movement of the supporting frame 25 and to ensure that it remains on the rails, a short horizontal plate 168 can be welded to the bottom surface at each end of the frame members 150. A projecting section of this plate extends under an elongate guiding member 170 which has a right angle cross-section and which is welded to the top of frame members 84, 86 and 98.

A greasing nipple or zerk can be provided at 172 in the end of the wheel shaft to permit grease to be fed through shaft passageways 174 to the inside of the bushing 154. In this way, adequate lubrication for rotation of the wheel is assured.

Figure 15:
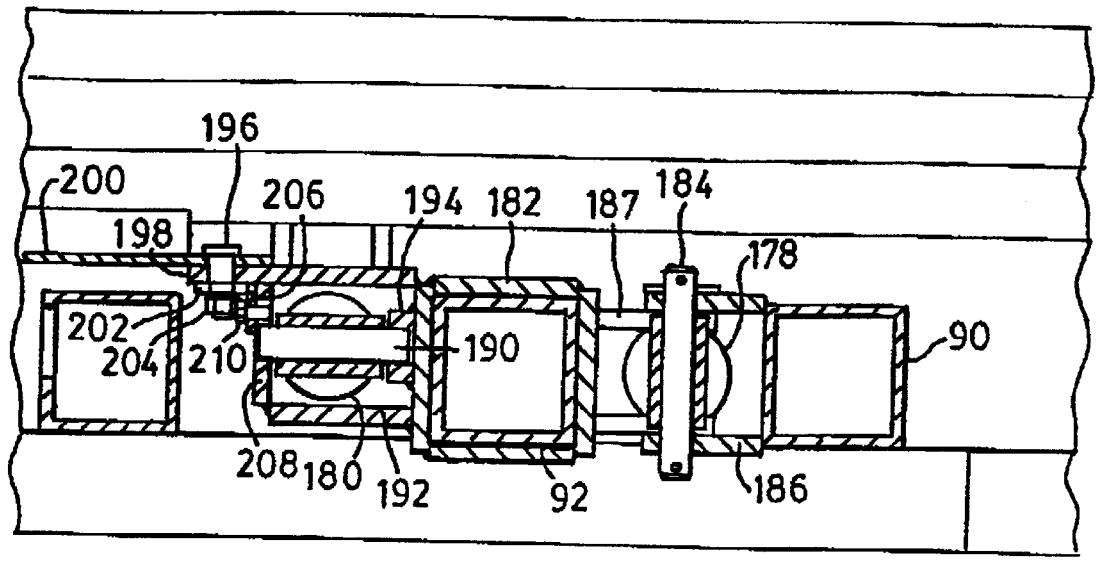
FIG. 15 is a cross-sectional view taken along the line XV—XV of FIG. 9 providing details of the hydraulic cylinders used to move the loading frame horizontally.

The drive means for moving the supporting frame 25 will now be described with particular reference to FIGS. 9, 12 and 15. The preferred illustrated drive means includes a first hydraulic cylinder device 178 and a second hydraulic cylinder device 180. The drive mechanism further includes a slidable support member 182 which can be tubular with a rectangular or square transverse cross-section. This support member is mounted for horizontal movement on the base frame 82 in a direction transverse to the longitudinal axis of the conveyor belt system. In particular, the illustrated support member is slidable along the horizontal frame member 92 which can also be tubular with a square or rectangular transverse cross-section. The cylinder end of the cylinder device 178 is connected by means of pin 184 to a bracket 186 mounted on the base frame. The rod end of cylinder device 178 is connected to bracket 187 at one end of the support member 182 by means of a pin 188. Turning now to the mounting for the second cylinder device 180, the cylinder end of this device is connected to the support member 182 by means of an eye pin 190. This pin is mounted in a cylinder supporting extension 192 which can be welded to the side of the support member 182. One end of the pin extends into a short support sleeve 194 welded to the side of the support member. Also shown in FIG. 15 is a pin retainer 206 which extends at least partially over an opening formed in extension wall 208, which receives one end of the pin 190. The pin retainer 206 is detachably connected to the wall 208 by means of bolt 210. Connected by means of a pin 196 to an upper flange 198 formed on the extension 192 is a cable tray 200. The pin 196 extends through a washer 202 and is held in place by hex nut 204. Also note that a second cable tray 212 is mounted on the end of transverse frame member 94. The cable trays 200 and 212 are a common feature on mobile machinery having cables and hoses. They help the user to get the cables and hoses to a portion of the apparatus that moves, for example, the loading frame which moves horizontally.

Figure 12:
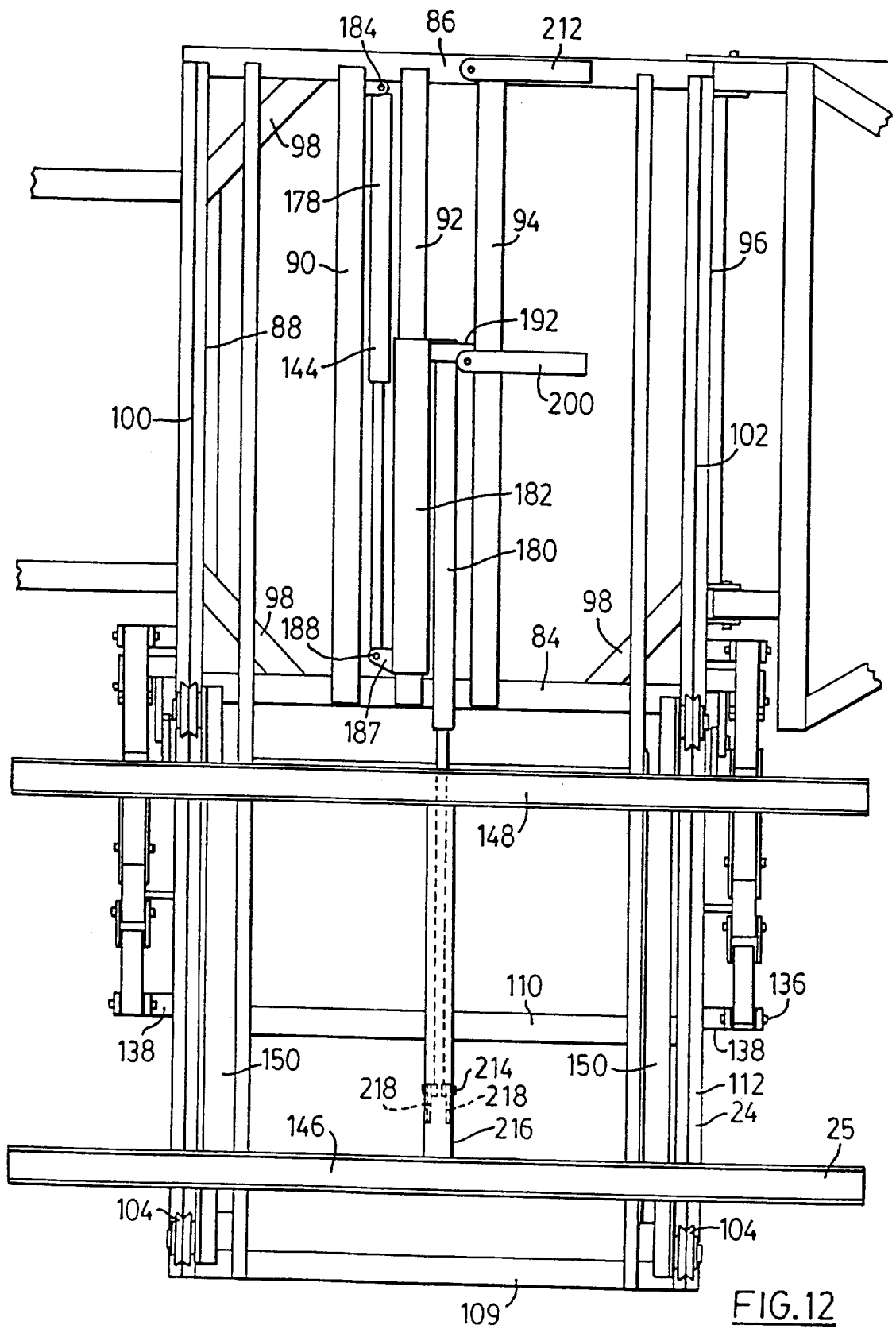
FIG. 12 is a plan view of the loading apparatus with a loading frame thereof shown in a lowered, horizontal position.
Figure 13:
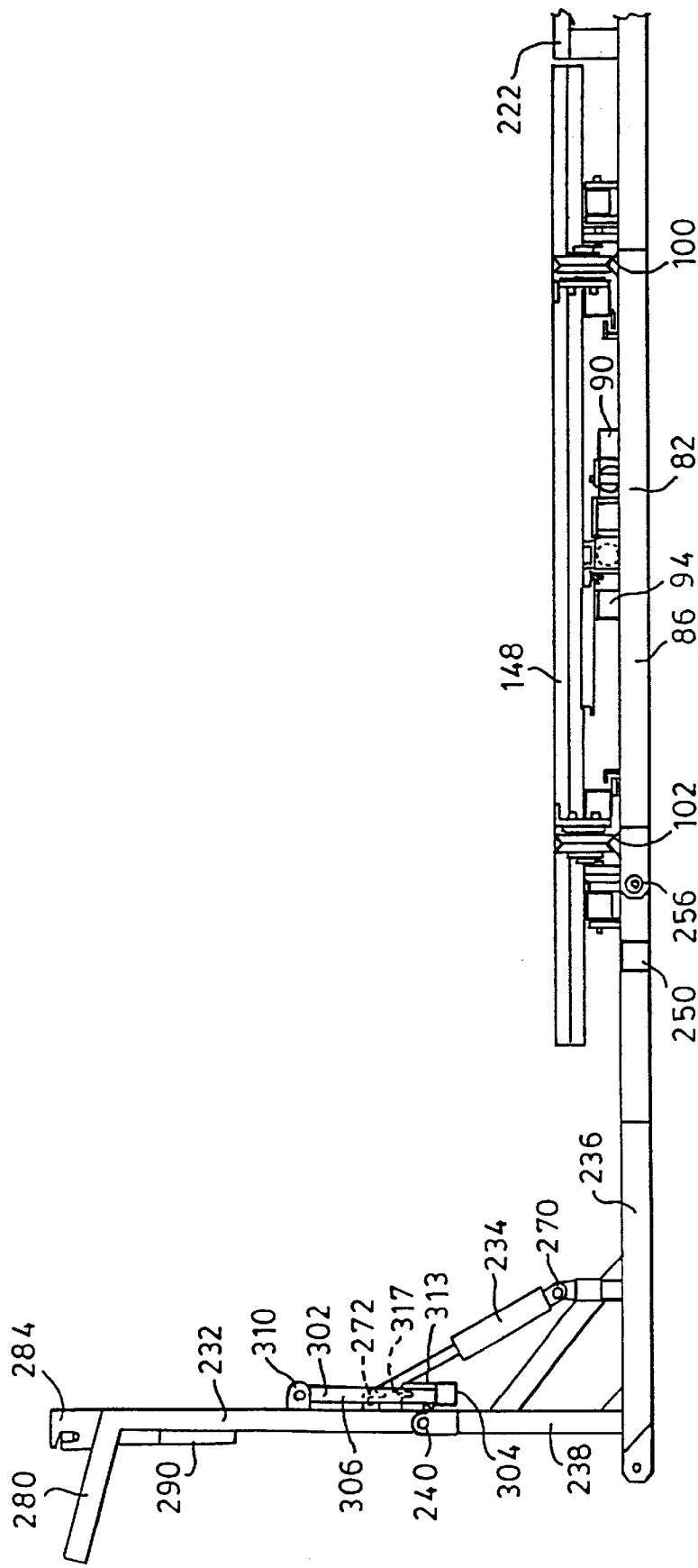
FIG. 13 is a side elevation of the loading apparatus with the aforementioned loading frame in the lowered, horizontal position and with an attached belt lifting apparatus being shown in a raised position.

The rod end of the cylinder device 180 (which is a secondary cylinder) is connected by means of an eye pin 214 to a further, elongate frame member 216 which extends between and connects the channel members 146, 148 (see FIG. 12). Two downwardly extending lugs are connected to the bottom of the frame member 216 and the lugs 218 have holes to accommodate the eye pin 214. Thus, the lugs connect the eye pin to the member 216 and standard cotter pins (not shown) can be used to hold the pin in place (these cotter pins are also used to hold other similar pins in the loading apparatus in place). It will be appreciated that the second hydraulic cylinder device 180 is adapted to move the support 25 horizontally relative to the support member 182. Thus, the extension of both of the hydraulic cylinder devices 178 and 180 is able to move the supporting frame 25 from a first position located over the base frame 82 (shown in FIGS. 9 to 11) to the second position located over the loading frame 24 when the latter is in its horizontal position, the second position being shown in FIGS. 12 to 14. It will also be appreciated that instead of using two separate hydraulic cylinder devices as shown, it is also possible to construct the loading apparatus with a single hydraulic cylinder device that has the necessary length when extended to move the supporting frame 25 to the position shown in FIG. 12.

With the preferred loading apparatus of the invention, a sloping ramp arrangement 220 which is fully shown in FIGS. 5 to 8 is provided. This ramp arrangement is provided at one end of the base frame 82 and it has an elevated end 222 which is shown in several of the drawings including FIGS. 9, 10 and 13. This elevated end is located adjacent to the supporting frame 25 when the latter is in the first position, that is over the base frame 82. As can be seen from FIGS. 5 to 8, the ramp arrangement permits sections of the extensible support apparatus 20 to be moved horizontally off the supporting frame and onto the supporting surface of the mine floor. As illustrated, the ramp arrangement includes two, parallel ramp sections 224 and 226. These sections are connected together by transverse, connecting frames 228, 230. It will be appreciated that the sloping upper surface of each ramp section 224, 226 is wide enough to accommodate the skid plates 66 provided on the bottom of the support legs of the extensible support apparatus.

According to another aspect of the present invention, there is also provided a belt lifting mechanism 230 connected to the base frame 82 at one end thereof. This belt lifting mechanism includes a pivotable belt lifting frame 232 and at least one fluid power cylinder device 234 connecting to the lifting frame at one end thereof and capable of pivoting the lifting frame to an elevated position shown in FIG. 13. It will be understood that this belt lifting apparatus is usable with the endless conveyor belt system in order to add the extension to the conveyor belt system described earlier. The preferred belt lifting apparatus includes a rigid, horizontally extending base frame 236 that is adapted to lie on a supporting surface, for example the floor of the mine passageway. The apparatus further includes an upwardly extending supporting framework 238 mounted on the base frame 236 and supported thereby. The lifting frame 232 which is capable of raising one or more lengths of conveyor belt temporarily is pivotably connected to the top end of the supporting framework 238 by means of two pins 240.

The preferred base frame 236 includes two parallel, spaced apart frame sections 242, 244, each of which is connected to another horizontal section 246, 248. Each of the sections 246, 248 extends at an acute angle to the longitudinal axis of the base frame indicated at A in FIG. 9. The outer ends of frame sections 246, 248 are connected by connecting frame member 250. The frame member 250 is connected to two short frame pieces 252, 254 which pivotably connect the belt lifting apparatus to the base frame 82 by means of pins 256. By removing the pins 256 from their respective holding brackets 258, one can detach the belt lifting apparatus from the main loading apparatus 22.

The preferred supporting framework 238 includes two vertically extending post members 260. Each post member can be supported by and strengthened by means of a sloping brace member 262. The hydraulic cylinder device 234 has its bottom end pivotably connected to the base frame 236 by means of an eye pin 270 (see FIG. 13) which can be held by a bracket extending upwardly from the base frame. The rod end is pivotably connected to the lifting frame by means of a pin connection at 272.

The lifting frame 232 includes two parallel frame members 274, 276. Extending upwardly at an angle from one end of each of these frame members is a shorter frame extension member 280 and the two members 280 are connected by transversely extending connecting frame member 282. Also connected to this end of each frame member 274, 276 is a slot forming plate 284 having a pin receiving slot at 286. Pivotably mounted on the two plates 284 is a belt lifting frame member 290 which can also be described as a trough idler frame. A troughing roll 289 rotatably mounted on the frame member 290 is adapted to engage a lower surface of one length of the conveyor belt and in particular the upper length which is shaped to form a trough. For ease of illustration, this troughing roll is only illustrated in FIG. 11. It is detachably connected at each outer end to the frame member 290 by means of hook connectors 291. As illustrated in FIG. 11, the belt lifting frame member includes a horizontal central frame section 291 and two upwardly and outwardly sloping frame sections 292, 293 which are connected to opposite ends of the central frame section. As shown clearly in FIG. 14, an upright end section 294 and 295 extends upwardly from each of the sloping frame sections 292, 293. A short, outwardly projecting pin 296 is provided at the upper end of each of end sections 294, 295 and this pin fits into the slot 286. Also projecting inwardly from each end section 294, 295 are two, spaced apart connecting sleeves 298, 300 and these are attaching devices for the troughing roller 289. The sleeves have vertical axes and are adapted to receive the hook connectors 291 to secure the troughing roller on the frame member. The use of sleeves 298, 300 at different heights permits the lifting height of the device to be adjusted.

The preferred belt lifting apparatus also includes a second belt lifting frame member 302 which is pivotably mounted on the lifting frame 232 in a central region thereof and has a straight roller 303 rotatably mounted thereon. This roller is only shown in FIG. 11 for ease of illustration and is adapted to engage a lower surface of a return section of the conveyor belt. This second lifting frame member is generally U-shaped and includes a horizontal straight frame member 304 and two upwardly extending end frames 306, 308 rigidly connected to opposite ends of the member 304. Pins 310 pivotably connect the frame member 302 to connecting brackets 312 mounted on the inside of the lifting frame 232. Rigidly mounted on the frame member 302 are flat, vertical plates 313, 315, each provided with a pin or axle receiving slot 317 extending down from its top edge. These plates enable the flat roller 303 to be mounted on the frame member 302.

FIGS. 10 and 11 show the belt lifting apparatus 230 in a lowered position with the cylinder device 234 retracted. In this position, both the upper and lower sections of the conveyor belt are allowed to rest on the rollers of the conveyor belt system including the rollers of a set of roller supporting frames that has been moved into alignment with the conveyor belt (see for example FIGS. 7 and 8 of the drawings). However, by extending the hydraulic cylinder device 234, the belt lifting apparatus can be brought to the raised position shown in FIGS. 13 and 14 and also in FIGS. 5 and 6. In this position, the upper and lower sections of the conveyor belt are raised, permitting a set of roller supporting frames to be installed into the conveyor belt system using the loading apparatus of the invention.

As can be seen from the above description, the present invention provides an efficient and time saving system and devices for extending an endless conveyor belt system, such as one used in an underground mine. The system includes an extensible support apparatus consisting of a set of roller supporting frames that can be stored and transported in a very compact configuration and then, when required, installed quickly into an existing, long conveyor belt system using a specially designed loading apparatus which forms another aspect of this invention. When not in use this loading apparatus is reasonably compact and because it can be installed underneath and adjacent one side of an existing conveyor belt system, it takes up very little additional room in the mine, particularly when its use is not required. Common, existing equipment in the mine, such as a loader, can be used to transport the cassette of stands and place it on the loading apparatus so that it can be moved into alignment with the conveyor system and then used to extend the conveyor system.

It will be appreciated by those skilled in the art that various modifications and changes can be made to the described extensible support apparatus, the loading apparatus and the conveyor belt lifting mechanism without departing from the spirit and scope of this invention. Accordingly, all such modifications and changes as fall within the scope of the appended claims are intended to be part of this invention.

We claim:

1. An extensible support apparatus for an endless conveyor belt comprising a set of roller supporting frames arranged in a row with each supporting frame including a substantially planar, vertically extending framework with rollers for said conveyor belt rotatably mounted thereon and a horizontally extending elongate frame member connected to said vertically extending framework, this framework extending substantially transversely of its respective frame member, connectors mounted on said frame members, each connector being movable in a generally horizontal direction along the elongate frame member of an adjacent roller supporting frame and movably connecting its respective roller supporting frame to said adjacent roller supporting frame, wherein the set of roller supporting frames is able to extend and retract between a compact transport configuration in which the vertically extending frameworks are arranged side-by-side and an extended configuration for supporting said conveyor belt.

2. An extensible support apparatus according to claim 1 wherein each connector is a loop-type connector that extends around and is slidable along said elongate frame member of the adjacent roller supporting frame.

3. An extensible support apparatus according to claim 1 wherein each vertically extending framework includes two upright support legs and a horizontally extending, connecting frame member extending between said support legs and rigidly connecting them together.

4. An extensible support apparatus according to claim 3 wherein each vertically extending framework includes a roller supporting upper frame member that extends substantially horizontally and is supported at one end thereof in cantilever fashion and at least one of said rollers is rotatably mounted on said upper frame member.

5. An extensible support apparatus according to claim 3 wherein one of said two support legs is substantially longer than the other support leg and each elongate frame member is rigidly connected to the longer support leg of its respective vertically extending framework.

6. An extensible support apparatus according to claim 3 wherein said rollers mounted on each framework include a generally horizontal, wide lower roller mounted above said connecting frame member and a three part troughing roller mounted in cantilever fashion above said lower roller, the troughing roller being supported at one end thereof by one of said support legs and at an opposite end thereof by an upper frame member that extends horizontally from said one support leg to which it is rigidly connected.

7. An extensible support apparatus according to claim 1 wherein there are at least six roller supporting frames arranged in said row.

8. An extensible support apparatus according to claim 3 wherein each elongate frame member is a hollow, cylindrical metal tube and each connector is mounted at one end of its respective frame member remote from the vertically extending framework of that frame member.

9. An extensible support apparatus according to claim 1 wherein each elongate frame member is at least five feet long.

10. An extensible support apparatus according to claim 6 wherein each upper frame member has a main portion that extends horizontally and an outer end portion that bends upwardly from said main portion and said opposite end of said troughing roller is supported by said outer end portion.

11. A loading apparatus for arranging an extensible support apparatus in an endless conveyor belt system, said loading apparatus comprising:

a generally horizontal base frame capable of resting on a horizontally extending supporting surface in longitudinal alignment with said conveyor belt system;

a loading frame pivotably mounted on one side of said base frame, said one side extending substantially parallel to a longitudinal axis of the conveyor belt system, said loading frame being pivotable from a horizontal position where said loading frame extends outwardly from said one side of the base frame to an elevated position where said loading frame extends vertically;

pivoting means connected to said loading frame for pivoting same from said horizontal position to said elevated position;

a movable supporting frame capable of supporting said extensible support apparatus and horizontally movable between a first position located over said base frame and a second position located over said loading frame when the latter is in its horizontal position; and drive means for moving said supporting frame from said second position to said first position.

12. A loading apparatus according to claim 10 including a belt lifting mechanism connected to said base frame at one end thereof said belt lifting mechanism including a pivotable belt lifting frame and a fluid power cylinder device connected to said lifting frame at one end thereof and capable of pivoting said lifting frame to an elevated position.

13. A loading apparatus according to claim 11 wherein said drive means for moving said supporting frame includes at least one hydraulic cylinder device connected to said base frame and extending substantially horizontally.

14. A loading apparatus according to claim 11 wherein said drive means includes first and second hydraulic cylinder devices and a slidable support member mounted for horizontal movement on said base frame in a direction transverse to said longitudinal axis of the conveyor belt system, said first hydraulic cylinder device being connected at one end thereof to said base frame and at an opposite end thereof to said slidable support member and adapted to slide said support member inwardly or outwardly, and said second hydraulic cylinder device being connected at one end thereof to said slidable support member and at an opposite end thereof to said supporting frame and adapted to move said supporting frame horizontally relative to said slidable support member.

15. A loading apparatus according to claim 11 wherein said movable supporting frame is mounted on wheels and both said base frame and said loading frame have tracks rigidly mounted thereon, said wheels being mounted so as to be rollable along said tracks when said loading frame is in its horizontal position.

16. A loading apparatus according to claim 11 including a sloping ramp arrangement located at one end of said base frame and having an elevated end located adjacent to said supporting frame when the latter is in said first position, said ramp arrangement permitting sections of said extensible support apparatus to be moved horizontally off said supporting frame and onto said supporting surface.

17. A loading apparatus according to claim 11 wherein said pivoting means includes two hydraulic cylinder devices each having one end thereof pivotally connected to said base frame at said one side thereof and two spaced-apart linkage mechanisms that are connected to and extend between said base frame and said loading frame, an opposite end of each of said hydraulic cylinder devices being pivotally connected to a respective one of said linkage mechanisms.

18. A loading apparatus for arranging a conveyor extending apparatus in an elongate endless conveyor belt system, said loading apparatus comprising:

a horizontally extending base frame capable of supporting said conveyor extending apparatus by means of support surfaces formed thereon, said base frame having a longitudinal central axis alignable with said conveyor belt system in a transverse direction thereof;

frame means for horizontally and outwardly extending said base frame on a side thereof parallel to said longitudinal central axis, said frame means being adapted to extend substantially outwardly from one longitudinal side of said conveyor belt system during use thereof;

a movable supporting frame capable of supporting said conveyor extending apparatus on a top thereof and horizontally movable between a first position where said supporting frame is located over said base frame and is supported by said support surfaces thereon and a second position where said supporting frame is located over and is supported by said frame means; and power drive means for moving said supporting frame from said second position to said first position.

19. A loading apparatus according to claim 18 wherein said power drive means includes first and second hydraulic cylinder devices and a slidable support member mounted for horizontal movement on said base frame in a direction perpendicular to said longitudinal central axis, said first hydraulic cylinder device being connected at one end thereof to said base frame and at an opposite end thereof to said slidable support member and adapted to slide said support member inwardly or outwardly, and said second hydraulic cylinder device being connected at one end thereof to said slidable support member and at an opposite end thereof to said supporting frame and adapted to move said supporting frame horizontally relative to said slidable support member.

20. A belt lifting apparatus usable with an endless conveyor belt system in order to add an extension to said conveyor belt system, said belt lifting apparatus comprising:

a rigid, horizontally extending base frame adapted to lie on a supporting surface;

an upwardly extending supporting framework mounted on said base frame and supported thereby;

lifting frame means for raising a length of conveyor belt temporarily, said frame means being pivotably connected at one end to said supporting framework;

drive means connected to said lifting frame means for pivoting said frame means from a lowered position to a raised position; and a belt lifting frame device mounted on said frame means and adapted to engage a lower surface of said length of conveyor belt.

21. A belt lifting apparatus according to claim 20 wherein said drive means is a hydraulic cylinder device connected to one side of said lifting frame means and a bottom end of said cylinder device is pivotably connected to said base frame.

22. A belt lifting apparatus according to claim 21 including a second belt lifting frame device pivotably mounted on said lifting frame means in a central region thereof and adapted to engage a lower surface of a return section of said conveyor belt.

23. A belt lifting apparatus according to claim 20 wherein the first mentioned belt lifting frame device is pivotably mounted on an end of said lifting frame means and includes a horizontal central frame section, two upwardly and outwardly sloping frame sections rigidly connected to opposite ends of said central frame section, and a troughing roll rotatably mounted thereon for engaging said lower surface of said length of conveyor belt.

24. A belt lifting apparatus according to claim 22 wherein said second belt lifting frame device includes a flat roller rotatably mounted thereon for engaging said lower surface of the return section.

* * * * *